United States Patent
Horstman et al.

(10) Patent No.: US 8,865,830 B2
(45) Date of Patent: Oct. 21, 2014

(54) CURABLE ORGANOSILOXANE BLOCK COPOLYMER EMULSIONS

(75) Inventors: John B. Horstman, Midland, MI (US); Donald Liles, Midland, MI (US); Steven Swier, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 13/983,380

(22) PCT Filed: Feb. 1, 2012

(86) PCT No.: PCT/US2012/023424
§ 371 (c)(1),
(2), (4) Date: Oct. 15, 2013

(87) PCT Pub. No.: WO2012/106391
PCT Pub. Date: Aug. 9, 2012

(65) Prior Publication Data
US 2014/0031465 A1  Jan. 30, 2014

Related U.S. Application Data

(60) Provisional application No. 61/439,437, filed on Feb. 4, 2011.

(51) Int. Cl.
C08K 3/00 (2006.01)
C08L 83/10 (2006.01)
C09D 183/10 (2006.01)
C08G 77/44 (2006.01)
C08J 3/03 (2006.01)

(52) U.S. Cl.
CPC ............... C09D 183/10 (2013.01); C08L 83/10 (2013.01); C08G 77/44 (2013.01); C08J 3/03 (2013.01)
USPC .......................................... 524/588; 427/387

(58) Field of Classification Search
USPC .......................................... 524/588; 427/387
See application file for complete search history.

(56) References Cited

U.S. PATENT DOCUMENTS

| 3,576,905 A | 4/1971 | McKeller et al. |
| 3,632,793 A | 1/1972 | Antonen |
| 3,636,134 A | 1/1972 | Antonen |
| 3,639,155 A | 2/1972 | Hartlein et al. |
| 4,340,709 A | 7/1982 | Jeram et al. |
| 4,585,670 A | 4/1986 | Liu |
| 5,145,933 A | 9/1992 | Grisoni et al. |
| 5,202,404 A * | 4/1993 | Takarada et al. ............... 528/34 |
| 5,705,103 A | 1/1998 | Chopdekar et al. |
| 6,020,409 A | 2/2000 | Alvarez et al. |
| 6,054,523 A | 4/2000 | Braun et al. |
| 7,705,093 B2 | 4/2010 | Kashiwagi et al. |
| 7,858,198 B2 | 12/2010 | Kashiwagi et al. |
| 7,955,486 B2 | 6/2011 | Yu et al. |
| 2003/0225212 A1* | 12/2003 | Keryk et al. .................. 525/100 |
| 2007/0116969 A1 | 5/2007 | Liu |
| 2008/0021136 A1 | 1/2008 | Kashiwagi et al. |
| 2009/0215955 A1 | 8/2009 | Osawa |
| 2011/0078916 A1 | 4/2011 | Fujikawa et al. |
| 2012/0028388 A1 | 2/2012 | Katayama |

FOREIGN PATENT DOCUMENTS

| EP | 1683823 A1 | 7/2006 |
| EP | 1927634 A1 | 6/2008 |
| WO | WO 2009114190 A2 | 9/2009 |
| WO | WO 2010051355 A2 | 5/2010 |
| WO | WO 2012040302 A1 | 3/2012 |
| WO | WO 2012040367 A1 | 3/2012 |

OTHER PUBLICATIONS

"Silicones," Apr. 15, 2003, Encyclopedia of Polymer Science and Technology, Wiley, US pp. 765-841.
International Search Report for Application No. PCT/US2011/052615 dated Dec. 2, 2011, 5 pages.
International Search Report for Application No. PCT/US2012/023424 dated Apr. 2, 2012, 3 pages.

* cited by examiner

*Primary Examiner* — Margaret Moore
(74) *Attorney, Agent, or Firm* — Howard & Howard Attorneys PLLC

(57) ABSTRACT

The present disclosure provides aqueous silicone emulsions of a "resin-linear" organosiloxane block copolymers. The present disclosure further provides a process for making these emulsions by forming a mixture of an organosiloxane block copolymer, admixing a sufficient amount of water to the mixture from to form an emulsion, and optionally further shear mixing the emulsion. The present invention further relates to the cured and/or coating compositions prepared from the present emulsions.

16 Claims, No Drawings

CURABLE ORGANOSILOXANE BLOCK COPOLYMER EMULSIONS

CROSS-REFERENCE TO RELATED APPLICATIONS

This application is the National Stage of International Patent Application No. PCT/US2012/023424, filed on Feb. 1, 2012, which claims priority to and all the advantages of U.S. Provisional Patent Application No. 61/439,437, filed on Feb. 4, 2011, the content of which is incorporated herein by reference.

BACKGROUND OF THE INVENTION

Resin-linear organosiloxane copolymers, such as those based on phenyl silsesquioxane and polydimethylsiloxane, can be difficult to prepare due to the incompatibility of the linear polydimethysiloxane blocks with the resinous silsesquioxane blocks. Base condensation or acid/metal catalyzed reactions have been attempted to link the intrinsically incompatible linear and resinous blocks. However, considerable fractions of unreacted material may remain and redistribution of the linear siloxane segments to lower molecular weight moieties may also occur. This results in inferior mechanical properties of such copolymers and translucent to cloudy copolymer compositions, indicative for a heterogeneous material.

A need exists to provide resin-linear organopolysiloxane copolymers in a product form that is low VOC compliant, stabilizes residual silanol groups on the resin-linear organopolysiloxane copolymer to ensure shelf stability, forms clear/transparent films upon drying, and yet is easy to apply to substrates for coating applications.

BRIEF SUMMARY OF THE INVENTION

The present disclosure provides aqueous silicone emulsions of a "resin-linear" organosiloxane block copolymer. The present disclosure provides a process for making these emulsions by forming a mixture of an organosiloxane block copolymer and an emulsifier, admixing a sufficient amount of water to the mixture to form an emulsion, and optionally further shear mixing the emulsion. The present invention further relates to the cured and/or coating compositions prepared from the present emulsions. In one embodiment, the cured coatings are transparent, having an optical clarity of at least 85%. In another embodiment, the cured coatings have a tensile strength of at least 0.1 MPa and an elongation of at least 50%. The present emulsions may be useful to provide weather resistant water based coatings.

DETAILED DESCRIPTION OF THE INVENTION

The present disclosure provides an aqueous silicone emulsion comprising:

A) an organosiloxane block copolymer comprising;

40 to 90 mole percent disiloxy units of the formula $[R^1{}_2SiO_{2/2}]$ 10 to 60 mole percent trisiloxy units of the formula $[R^2SiO_{3/2}]$ 0.5 to 35 mole percent silanol groups $[\equiv SiOH]$ where $R^1$ is independently a $C_1$ to $C_{30}$ hydrocarbyl, $R^2$ is independently a $C_1$ to $C_{20}$ hydrocarbyl, wherein;

the disiloxy units $[R^1{}_2SiO_{2/2}]$ are arranged in linear blocks having an average of from 10 to 400 disiloxy units $[R^1{}_2SiO_{2/2}]$ per linear block, the trisiloxy units $[R^2SiO_{3/2}]$ are arranged in non-linear blocks having a molecular weight of at least 500 g/mol, and at least 30% of the non-linear blocks are crosslinked with each other, each linear block is linked to at least one non-linear block, and the organosiloxane block copolymer has a molecular weight of at least 20,000 g/mole;

B) 0.1 to 50 parts by weight of an emulsifier for every 100 parts by weight of the organosiloxane block copolymer.

A) The Organosiloxane Block Copolymer

The present disclosure relates to emulsions of organopolysiloxanes that are described herein as "resin-linear" organosiloxane block copolymers. Organopolysiloxanes are polymers containing siloxy units independently selected from $(R_3SiO_{1/2})$, $(R_2SiO_{2/2})$, $(RSiO_{3/2})$, or $(SiO_{4/2})$ siloxy units, where R may be any organic group. These siloxy units are commonly referred to as M, D, T, and Q units respectively. These siloxy units can be combined in various manners to form cyclic, linear, or branched structures. The chemical and physical properties of the resulting polymeric structures vary depending on the number and type of siloxy units in the organopolysiloxane. "Linear" organopolysiloxanes typically contain mostly D or $(R_2SiO_{2/2})$ siloxy units, which results in polydiorganosiloxanes that are fluids of varying viscosity, depending on the "degree of polymerization" or DP as indicated by the number of D units in the polydiorganosiloxane. "Linear" organopolysiloxanes typically have glass transition temperatures ($T_g$) that are lower than 25° C. "Resin" organopolysiloxanes result when a majority of the siloxy units are selected from T or Q siloxy units. When T siloxy units are predominately used to prepare an organopolysiloxane, the resulting organosiloxane is often referred to as a "silsesquioxane resin". Increasing the amount of T or Q siloxy units in an organopolysiloxane typically results in polymers having increasing hardness and/or glass like properties. "Resin" organopolysiloxanes thus have higher $T_g$ values, for example siloxane resins often have $T_g$ values greater than 50° C.

As used herein "resin-linear organosiloxane block copolymers" refer to organopolysiloxanes containing "linear" D siloxy units in combination with "resin" T siloxy units. The present organosiloxane copolymers are "block" copolymers, as opposed to "random" copolymers. As such, the present "resin-linear organosiloxane block copolymers" refer to organopolysiloxanes containing D and T siloxy units, where the D units are primarily bonded together to form polymeric chains having 10 to 400 D units, which are referred herein as "linear blocks". The T units are primarily bonded to each other to form branched polymeric chains, which are referred to as "non-linear blocks". A significant number of these non-linear blocks may further aggregate to form "nano-domains" when solid forms of the block copolymer are provided. More specifically, the disiloxy units $[R^1{}_2SiO_{2/2}]$ are arranged in linear blocks having an average of from 10 to 400 disiloxy units $[R^1{}_2SiO_{2/2}]$ per linear block, and the trisiloxy units $[R^2SiO_{3/2}]$ are arranged in non-linear blocks having a molecular weight of at least 500 g/mol and at least 30% of the non-linear blocks are crosslinked with each other.

The present organosiloxane block copolymers comprising 40 to 90 mole percent disiloxy units of the formula $[R^1{}_2SiO_{2/2}]$ and 10 to 60 mole percent trisiloxy units of the formula $[R^2SiO_{3/2}]$ may be represented by the formula $[R^1{}_2SiO_{2/2}]_a[R^2SiO_{3/2}]_b$ where the subscripts a and b represent the mole fractions of the siloxy units in the copolymer, a may vary from 0.4 to 0.9,
   alternatively from 0.5 to 0.9,
      alternatively from 0.6 to 0.9,
b may vary from 0.1 to 0.6,
   alternatively from 0.1 to 0.5,
      alternatively from 0.1 to 0.4,
$R^1$ is independently a $C_1$ to $C_{30}$ hydrocarbyl,
$R^2$ is independently a $C_1$ to $C_{10}$ hydrocarbyl, It should be understood that the present organosiloxane block copolymers may contain additional siloxy units, such as M siloxy units, Q siloxy units, other unique D or T siloxy units (for example having a organic groups other than $R^1$ or $R^2$), providing the organosiloxane block copolymer contains the mole fractions of the disiloxy and trisiloxy units as described above. In other words, the sum of the mole fractions as designated by subscripts a and b, do not necessarily have to sum to one. The sum of a+b may be less than one to account for minor amounts of other siloxy units that may be present in the organosiloxane block copolymer. Alternatively, the sum of a+b is greater than 0.6, alternatively greater than 0.7, alternatively greater than 0.8, or alternatively greater than 0.9.

In one embodiment, the organosiloxane block copolymer consists essentially of the disiloxy units of the formula $[R^1_2SiO_{2/2}]$ and trisiloxy units of the formula $[R^2SiO_{3/2}]$, while also containing 0.5 to 25 mole percent silanol groups [≡SiOH], where $R^1$ and $R^2$ are as defined above. Thus, in this embodiment, the sum of a+b (when using mole fractions to represent the amount of disiloxy and trisiloxy units in the copolymer) is greater than 0.95, alternatively greater than 0.98.

The resin-linear organosiloxane block copolymers also contain silanol groups (≡SiOH). The amount of silanol groups present on the organosiloxane block copolymer may vary from 0.5 to 35 mole percent silanol groups [≡SiOH],
   alternatively from 2 to 32 mole percent silanol groups [≡SiOH],
      alternatively from 8 to 22 mole percent silanol groups [≡SiOH].

The silanol groups may be present on any siloxy units within the organosiloxane block copolymer. The amount described above represent the total amount of silanol groups found in the organosiloxane block copolymer. However, the present inventors believe the majority of the silanol groups will reside on the trisiloxy units, i.e., the resin component of the block copolymer. Although not wishing to be bound by any theory, the present inventors believe the silanol groups present on the resin component of the organosiloxane block copolymer allows for the block copolymer to further react or cure at elevated temperatures.

$R^1$ in the above disiloxy unit formula is independently a $C_1$ to $C_{30}$ hydrocarbyl. The hydrocarbon group may independently be an alkyl, aryl, or alkylaryl group. As used herein, hydrocarbyl also includes halogen substituted hydrocarbyls. $R^1$ may be a $C_1$ to $C_{30}$ alkyl group, alternatively $R^1$ may be a $C_1$ to $C_{18}$ alkyl group. Alternatively $R^1$ may be a $C_1$ to $C_6$ alkyl group such as methyl, ethyl, propyl, butyl, pentyl, or hexyl. Alternatively $R^1$ may be methyl. $R^1$ may be an aryl group, such as phenyl, naphthyl, or an anthryl group. Alternatively, $R^1$ may be any combination of the aforementioned alkyl or aryl groups. Alternatively, $R^1$ is phenyl, methyl, or a combination of both.

Each $R^2$ in the above trisiloxy unit formula is independently a $C_1$ to $C_{20}$ hydrocarbyl. As used herein, hydrocarbyl also includes halogen substituted hydrocarbyls. $R^2$ may be an aryl group, such as phenyl, naphthyl, anthryl group. Alternatively, $R^2$ may be an alkyl group, such as methyl, ethyl, propyl, or butyl. Alternatively, $R^2$ may be any combination of the aforementioned alkyl or aryl groups. Alternatively, $R^2$ is phenyl or methyl.

The formula $[R^1_2SiO_{2/2}]_a[R^2SiO_{3/2}]_b$, and related formulae using mole fractions, as used herein to describe the present organosiloxane block copolymers, does not indicate structural ordering of the disiloxy $[R^1_2SiO_{2/2}]$ and trisiloxy $[R^2SiO_{3/2}]$ units in the copolymer. Rather, this formula is meant to provide a convenient notation to describe the relative amounts of the two units in the copolymer, as per the mole fractions described above via the subscripts a and b. The mole fractions of the various siloxy units in the present organosiloxane block copolymers, as well as the silanol content, may be readily determined by $^{29}Si$ NMR techniques, as detailed in the Examples.

The present organosiloxane block copolymers have an average molecular weight ($M_w$) of at least 20,000 g/mole, alternatively an average molecular weight of at least 40,000 g/mole alternatively an average molecular weight of at least 50,000 g/mole, alternatively an average molecular weight of at least 60,000 g/mole, alternatively an average molecular weight of at least 70,000 g/mole, or alternatively an average molecular weight of at least 80,000 g/mole. The average molecular weight may be readily determined using Gel Permeation Chromatography (GPC) techniques, such as those described in the Examples.

The structural ordering of the disiloxy and trisiloxy units may be further described as follows; the disiloxy units $[R^1_2SiO_{2/2}]$ are arranged in linear blocks having an average of from 10 to 400 disiloxy units $[R^1_2SiO_{2/2}]$ per linear block, and the trisiloxy units $[R^2SiO_{3/2}]$ are arranged in non-linear blocks having a molecular weight of at least 500 g/mol. Each linear block is linked to at least one non-linear block in the block copolymer. Furthermore, at least at 30% of the non-linear blocks are crosslinked with each other,
   alternatively at least at 40% of the non-linear blocks are crosslinked with each other,
   alternatively at least at 50% of the non-linear blocks are crosslinked with each other.

The crosslinking of the non-linear blocks may be accomplished via a variety of chemical mechanisms and/or moieties. For example, crosslinking of non-linear blocks within the block copolymer may result from the condensation of residual silanol groups present in the non-linear blocks of the copolymer. Crosslinking of the non-linear blocks within the block copolymer may also occur between "free resin" components and the non-linear blocks. "Free resin" components may be present in the block copolymer compositions as a result of using an excess amount of an organosiloxane resin during the preparation of the block copolymer. The free resin component may crosslink with the non-linear blocks by condensation of the residual silanol groups present on the non-blocks and on the free resin. The free resin may provide crosslinking by reacting with lower molecular weight compounds added as crosslinkers, as described below.

Alternatively, certain compounds may have been added during the preparation of the block copolymer to specifically crosslink the non-resin blocks. These crosslinking compounds may include an organosilane having the formula $R^5_qSiX_{4-q}$ is added during the formation of the block copolymer (step II as discussed below), where $R^5$ is a $C_1$ to $C_8$ hydrocarbyl or a $C_1$ to $C_8$ halogen-substituted hydrocarbyl, X is a hydrolysable group, and q is 0, 1, or 2. $R^5$ is a $C_1$ to $C_8$ hydrocarbyl or a $C_1$ to $C_8$ halogen-substituted hydrocarbyl, or alternatively $R^5$ is a $C_1$ to $C_8$ alkyl group, or alternatively a phenyl group, or alternatively $R^5$ is methyl, ethyl, or a combination of methyl and ethyl. X is any hydrolyzable group, alternatively X may be a, an oximo, acetoxy, halogen atom, hydroxyl (OH), or an alkoxy group. In one embodiment, the organosilane is an alkyltriacetoxysilane, such as methyltriacetoxysilane, ethyltriacetoxysilane, or a combination of both. Commercially available representative alkyltriacetoxysilanes include ETS-900 (Dow Corning Corp., Midland, Mich.). Other suitable, non-limiting organosilanes useful as crosslinkers include; methyl-tris(methylethylketoxime)silane (MTO), methyl triacetoxysilane, ethyl triacetoxysilane, tetraacetoxysilane, tetraoximesilane, dimethyl diacetoxysilane, dimethyl dioximesilane, methyl tris(methylmethylketoxime)silane.

The crosslinks within the block copolymer will primarily be siloxane bonds $\equiv$Si—O—Si$\equiv$, resulting from the condensation of silanol groups, as discussed above.

The amount of crosslinking in the block copolymer may be estimated by determining the average molecular weight of the block copolymer, such as with GPC techniques. Typically, crosslinking the block copolymer increases its average molecular weight. Thus, an estimation of the extent of crosslinking may be made, given the average molecular weight of the block copolymer, the selection of the linear siloxy component (that is the chain length as indicated by its degree of polymerization), and the molecular weight of the non-linear block (which is primarily controlled by the selection of the selection of the organosiloxane resin used to prepare the block copolymer).

The present disclosure further provides curable compositions comprising:
 a) the organosiloxane block copolymers as described above, and
 b) an organic solvent.

The organic solvent typically is an aromatic solvent, such as benzene, toluene, or xylene.

In one embodiment, the curable compositions may further contain an organosiloxane resin. The organosiloxane resin present in these compositions typically will be the organosiloxane resin used to prepare the organosiloxane block copolymer. Thus, the organosiloxane resin may comprise at least 60 mol % of [$R^2SiO_{3/2}$] siloxy units in its formula, where each $R^2$ is independently a $C_1$ to $C_{20}$ hydrocarbyl. Alternatively, the organosiloxane resin is a silsesquioxane resin, or alternatively a phenyl silsesquioxane resin.

The amount of the organosiloxane block copolymers, organic solvent, and optional organosiloxane resin in the present curable composition may vary. The curable composition of the present disclosure may contain;
 40 to 80 weight % of the organosiloxane block copolymer as described above,
 10 to 80 weight % of the organic solvent, and
 5 to 40 weight % of the organosiloxane resin,
providing the sum of the weight % of these components does not exceed 100%. In one embodiment, the curable compositions consist essentially of the organosiloxane block copolymer as described above, the organic solvent, and the organosiloxane resin. In this embodiment, the weight % of these components sum to 100%, or nearly 100%.

In yet another embodiment, the curable compositions contain a cure catalyst. The cure catalyst may be selected from any catalyst known in the art to affect condensation cure of organosiloxanes, such as various tin or titanium catalysts. Condensation catalyst can be any condensation catalyst typically used to promote condensation of silicon bonded hydroxy (=silanol) groups to form Si—O—Si linkages. Examples include, but are not limited to, amines, complexes of lead, tin, titanium, zinc, and iron.

The organosiloxane block copolymers and curable compositions containing the organosiloxane block copolymer may be prepared by the methods as taught in PCT/US11/52513 or PCT/US11/052,615, both as filed on Sep. 21, 2011 and herein incorporated by reference. Representative examples of their preparation are also detailed in the Examples section below.

B) The Emulsifier

Component B) in the compositions of the present disclosure is an emulsifier. As used herein, "emulsifier" refers to any compound or substance that enables the formation of an emulsion. The emulsion may be an oil/water emulsion, a water/oil emulsion, or a multiple phase/triple emulsion. The emulsifier may be selected from any surface active compound or polymer capable of stabilizing emulsions. Typically, such surface active compounds or polymers stabilize emulsions by preventing coalescence of the dispersed particles. The surface active compounds useful as emulsifiers in the present process may be a surfactant or combination of surfactants. The surfactant may be an anionic surfactant, cationic surfactant, nonionic surfactant, amphoteric surfactant, or a mixture of any of these surfactants.

Representative examples of suitable anionic surfactants include alkali metal, amine, or ammonium salts of higher fatty acids, alkylaryl sulphonates such as sodium dodecyl benzene sulfonate, long chain fatty alcohol sulfates, olefin sulfates and olefin sulfonates, sulfated monoglycerides, sulfated esters, sulfonated ethoxylated alcohols, sulfosuccinates, alkane sulfonates, phosphate esters, alkyl isethionates, alkyl taurates, and alkyl sarcosinates. In one embodiment, the anionic surfactant is Tea-dodecylbenzene sulfonate, such as commercially available Bio-Soft® N-300 (Stepan, Northfield Ill.).

Representative examples of suitable cationic surfactants include alkylamine salts, quaternary ammonium salts, sulphonium salts, and phosphonium salts. Representative examples of suitable nonionic surfactants include condensates of ethylene oxide with long chain fatty alcohols or fatty acids such as a $C_{12-16}$ alcohol, condensates of ethylene oxide with an amine or an amide, condensation products of ethylene and propylene oxide, esters of glycerol, sucrose, sorbitol, fatty acid alkylol amides, sucrose esters, fluoro-surfactants, and fatty amine oxides. Representative examples of suitable amphoteric surfactants include imidazoline compounds, alkylaminoacid salts, and betaines.

Representative examples of suitable commercially available nonionic surfactants include polyoxyethylene fatty alcohols sold under the tradename BRIJ® by Croda (ICI Surfactants), Wilmington, Del. Some examples are BRIJ® 35 Liquid, an ethoxylated alcohol known as polyoxyethylene (23) lauryl ether, and BRIJ® 30, another ethoxylated alcohol known as polyoxyethylene (4) lauryl ether. Some additional nonionic surfactants include ethoxylated alcohols sold under the trademark TERGITOL® by The Dow Chemical Company, Midland, Mich. Some example are TERGITOL® TMN-6, an ethoxylated alcohol known as ethoxylated trimethylnonanol; and various of the ethoxylated alcohols, i.e., $C_{12}$-$C_{14}$ secondary alcohol ethoxylates, sold under the trademarks TERGITOL® 15-S-5, TERGITOL® 15-S-12, TERGITOL® 15-S-15, and TERGITOL® 15-S-40. Lutensol® supplied by BASF in the series of Lutensol XP known as ethoxylated, C10-Guerbet alcohol and Lutensol TO known as ethoxylated, iso-C13 alcohol may also be used. In one embodiment, the nonionic surfactant is POE (20) ISOHEXADECYL ETHER, such as Arlasolve® 200 commercially available from Croda.

When mixtures containing nonionic surfactants are used, one nonionic surfactant may have a low Hydrophile-Lipophile Balance (HLB) and the other nonionic surfactant may have a high HLB, such that the two nonionic surfactants have a combined HLB of 11-15, alternatively a combined HLB of 12.5-14.5.

Alternatively, the emulsifier may be a polymer or those materials consider as "thickeners" or "thickening agents". When a polymer or "thickener" is used as an emulsifier, it may be used alone, or in combination with any of the aforementioned surfactants. Suitable polymeric emulsifiers include polyvinyl alcohol, cellulosic polymers or xanthan gums. The polyvinyl alcohol includes hydrolyzed polyvinyl alcohols, such as 80-95% hydrolyzed polyvinyl alcohol. Suitable thickening agents are exemplified by sodium alginate, gum arabic, polyoxyethylene, guar gum, hydroxypropyl guar gum, ethoxylated alcohols, such as laureth-4 or polyethylene glycol 400, cellulose derivatives exemplified by carboxy methylcellulose, methylcellulose, methylhydroxypropylcellulose, hydroxypropylcellulose, polypropylhydroxyethylcellulose, starch, and starch derivatives exemplified by hydroxyethylamylose and starch amylose, locust bean gum, electrolytes exemplified by sodium chloride and ammonium chloride, and saccharides such as fructose and glucose, and derivatives of saccharides such as PEG-120 methyl glucose diolate or mixtures of 2 or more of these. Typically the thickening agent is selected from the group consisting of cellulose derivatives, saccharide derivatives, and electrolytes, or from a combination of two or more of the above thickening agents exemplified by a combination of a cellulose derivative and any electrolyte, and a starch derivative and any electrolyte.

In one embodiment, the emulsion products of the present disclosure are oil/water emulsions, wherein the "oil" phase may include, consist essentially of, or consist of A) the organosiloxane block copolymer stabilized in a continuous aqueous phase by B) the emulsifier. In one embodiment, the oil phase of the emulsion consists essentially of the organosiloxane block copolymer and the emulsifier does not include other silicone polymers.

Other additives can also be incorporated in the emulsions of the present disclosure, such as fillers, foam control agents; anti-freeze agents and biocides.

The present emulsions may be prepared by any known methods, or alternatively prepared by the methods as discussed below.

The present disclosure further provides a process for preparing an emulsion by;
I) forming a mixture comprising;
  A) 100 parts by weight of an organosiloxane block copolymer, as described above; and optionally c) a solvent,
  B) 0.1 to 50 parts by weight of an emulsifier, as described above;
II) admixing a sufficient amount of water to the mixture from step I) to form an emulsion,
III) optionally, further shear mixing the emulsion.

An optional solvent may be added in step I. The optional solvent may be added to ease the handling and mixing of the organosiloxane block copolymer. This is particularly useful when the organosiloxane block copolymer has a high molecular weight, or is a high viscosity fluid, gum or solid at room temperature. The solvent may be the same organic solvent used in the preparation of the organosiloxane block copolymer, where all or part of the organic solvent remains in combination with the organosiloxane block copolymer. Alternatively, additional solvent may be added to the organosiloxane block copolymer. The added solvent may be the same or different from the solvent used in the preparation of organosiloxane block copolymer. Furthermore, the added solvent may be either an organic solvent or a siloxane solvent. Suitable siloxane solvents include a low viscosity organopolysiloxanes or a volatile methyl siloxanes or a volatile ethyl siloxanes or a volatile methyl ethyl siloxanes having a viscosity at 25° C. in the range of 1 to 1,000 mm$^2$/sec such as hexamethylcyclotrisiloxane, octamethylcyclotetrasiloxane, decamethylcyclopentasiloxane, dodecamethylcyclohexasiloxane, octamethyltrisiloxane, decamethyltetrasiloxane, dodecamethylpentasiloxane, tetradecamethylhexasiloxane, hexadeamethylheptasiloxane, heptamethyl-3-{(trimethylsilyl)oxy)}trisiloxane, hexamethyl-3,3,bis{(trimethylsilyl)oxy}trisiloxane pentamethyl{(trimethylsilyl)oxy}cyclotrisiloxane as well as polydimethylsiloxanes, polyethylsiloxanes, polymethylethylsiloxanes, polymethylphenylsiloxanes, polydiphenylsiloxanes, and any mixtures thereof.

The emulsifier may be added either alone or in combination with varying amounts of water in step I. Typically, when a surfactant or surfactant combination is selected as the emulsifier, the surfactant is added in step I as a concentrated aqueous dispersion, or alternatively as an aqueous solution.

The amount of emulsifier added in step I should be 0.1 to 50 parts by weight for every 100 parts by weight of the organosiloxane block copolymer used. Alternatively, the amount of emulsifier added in step I may be 1 to 50 parts by weight for every 100 parts by weight of the organosiloxane block copolymer used. Alternatively, the amount of emulsifier added in step I may be 2 to 20 parts by weight for every 100 parts by weight of the organosiloxane block copolymer used.

Mixing in step (I) can be accomplished by any method known in the art to effect mixing of high viscosity materials. The mixing may occur either as a batch, semi-continuous, or continuous process. Mixing may occur, for example using, batch mixing equipments with medium/low shear include change-can mixers, double-planetary mixers, conical-screw mixers, ribbon blenders, double-arm or sigma-blade mixers; batch equipments with high-shear and high-speed dispersers include those made by Charles Ross & Sons (NY), Hockmeyer Equipment Corp. (NJ); batch equipments with high shear actions include Banbury-type (C W Brabender Instruments Inc., NJ) and Henschel type (Henschel mixers America, Tex.). Illustrative examples of continuous mixers/compounders include extruders single-screw, twin-screw, and multi-screw extruders, co-rotating extruders, such as those manufactured by Krupp Werner & Pfleiderer Corp (Ramsey, N.J.), and Leistritz (NJ); twin-screw counter-rotating extruders, two-stage extruders, twin-rotor continuous mixers, dynamic or static mixers or combinations of these equipments.

The temperature and pressure at which the mixing of step I occurs is not critical, but generally is conducted at ambient temperature and pressures. Typically, the temperature of the mixture will increase during the mixing process due to the mechanical energy associated when shearing such high viscosity materials.

Step II of the process involves admixing water to the mixture of step I to form an emulsion. Typically 5 to 2000 parts by weight water are mixed for every 100 parts by weight of the step I mixture to form an emulsion. The water is added to the mixture from step I at such a rate, with additional mixing, so as to form an emulsion of the mixture of step I. While this amount of water can vary depending on the selection of the emulsifier, generally the amount of water is from 5 to 2000 parts per 100 parts by weight of the step I mixture, alternatively from 5 to 500 parts per 100 parts by weight of the step I mixture, or alternatively from 5 to 100 parts per 100 parts by weight of the step I mixture.

The water added to the mixture from step I may be done in incremental portions, whereby each incremental portion comprises less than 30 weight % of the mixture from step I and each incremental portion of water is added successively to the previous after the dispersion of the previous incremental portion of water, wherein sufficient incremental portions of water are added to form an emulsion of the organosiloxane block copolymer.

Mixing in step (II) can be accomplished by any method known in the art to effect mixing of high viscosity materials. The mixing may occur either as a batch, semi-continuous, or continuous process. Any of the mixing methods as described for step (I), may be used to effect mixing in step (II). Alternatively, mixing in step (II) may also occur via those techniques known in the art to provide high shear mixing to effect formation of emulsions. Representative of such high shear mixing techniques include; homogenizers, sonilators, and other similar shear devices.

Optionally, the emulsion formed in step (II) may be further sheared according to step (III) to reduce particle size and/or improve long term storage stability. The shearing may occur by any of the mixing techniques discussed above.

The emulsion products of the present disclosure may be an oil/water emulsion, a water/oil emulsion, a multiple phase or triple emulsion.

In one embodiment, the emulsion products of the present disclosure are oil/water emulsions. The present oil/water emulsions may be characterized by average volume particle of the dispersed organosiloxane block copolymer (oil) phase in the continuous aqueous phase. The particle size may be determined by laser diffraction of the emulsion. Suitable laser diffraction techniques are well known in the art. The particle size is obtained from a particle size distribution (PSD). The PSD can be determined on a volume, surface, length basis. The volume particle size is equal to the diameter of the sphere that has the same volume as a given particle. The term Dv represents the average volume particle size of the dispersed particles. Dv 0.5 is the particle size measured in volume corresponding to 50% of the cumulative particle population. In other words if Dv 0.5=10 µm, 50% of the particle have an average volume particle size below 10 µm and 50% of the particle have a volume average particle size above 10 µm. Unless indicated otherwise all average volume particle sizes are calculated using Dv 0.5.

The average volume particle size of the dispersed siloxane particles in the oil/water emulsions may vary between 0.1 µm and 150 µm; or between 0.1 µm and 30 µm; or between 0.3 µm and 5.0 µm.

The emulsions of the present disclosure may be further characterized by the properties of the resulting films or coatings produced after allowing a film of the emulsion to dry. Typically, such coatings are obtained by forming a film of the emulsion on a surface, and allowing the film to stand for a sufficient period of time to evaporate the water present in the emulsion. This process may be accelerated by increasing the ambient temperature of the film or coating.

In one embodiment, the emulsion of the organosiloxane block copolymer is cured to form a transparent film or coating that is optically clear. Optical clarity can be defined by ASTM D1003-07e1 *Standard Test Method for Haze and Luminous Transmittance of Transparent Plastics*, with a value of at least 85%, alternatively at least 90%.

In further embodiment, the emulsion of the organosiloxane block copolymer is cured to form a film or coating that has elastomeric properties. The elastomeric properties may be characterized by measuring tensile strength and % elongation of the resulting film or coating. Tensile strength and % elongation at break may be determined by testing "dog bone" shaped samples stamped from thin films (typically 2 mm thickness) in an INSTRON at a 5 mm/min drawing speed. Samples were tested up to failure. In this embodiment, the cured film or coating resulting from the present emulsions may have a tensile strength of at least 0.1 MPa, alternatively 0.5 MPa, or alternatively 1 MPa. The cured film or coating resulting from the present emulsions may have a % elongation of at least 50%, alternatively 100%, or alternatively 300%.

In comparison to a chemically cross-linked PDMS rubber particle emulsion, the present emulsions may provide cured films or coatings having improved strength and toughness without the need for fillers. Since the elastomeric nature is introduced by the phase separated resin domains, heating the particles above the glass transition may result in consolidation through particle fusing and excellent film formation. This may overcome critical issues facing chemically cross-linked siloxane-based particles, unable to fuse after emulsion casting. Thus, the present resin-linear emulsions provide new methods for delivering a silicone based thermoplastic elastomer (TPE) in an environmentally friendly composition. The spherical particles in the emulsion can fuse and upon heating and result in tough, elastomeric films. These emulsions may be useful in weather resistant water based coatings.

EXAMPLES

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention. All percentages are in wt. %. All measurements were conducted at 23° C. unless indicated otherwise.

Characterization Techniques
$^{29}$Si and $^{13}$C NMR Spectrometry

NMR samples of resin linear products were prepared by weighing ~3 grams of solvent free resin linear (prepared by drying sample overnight at room temperature), 1 g of CDCl$_3$, and 4 grams of 0.04M Cr(acac)$_3$ solution in CDCl$_3$ into a vial and mixing thoroughly. Samples were then transferred into a silicon-free NMR tube. Spectra were acquired using a Varian Mercury 400 MHz NMR. NMR samples of other materials such as 217 Flake and silanol terminated PDMS were prepared by diluting 4 g of sample into 4 grams of 0.04M Cr(acac)$_3$ solution in CDCl$_3$.

$^{13}$C NMR experiments were performed in the following manner. Samples were placed into 16 mm glass NMR tubes. A 5 mm NMR tube was placed inside the 16 mm tube and filled with lock solvent. 13C DEPT NMR was acquired in 12 or 20 minute signal averaging blocks. Data was acquired on a Varian Inova NMR spectrometer with a 1H operational frequency of 400 MHz.

Silanol content of resin linear products was calculated from the integration values of the T(Ph,OZ) and T(Ph,OZ2) regions in the 29Si NMR spectrum. T(Alkyl) groups were considered fully condensed (assumption) and subtracted from the T(Ph,OZ) region. The T(Alkyl) content was calculated by multiplying the integration value of D(Me$_2$) from $^{29}$Si NMR by the fraction (mols Si of coupling agent/ mols Si of PDMS used in the synthesis formulation). Isopropoxy from 217 Flake was not subtracted out of the OZ values due to its low concentration. Therefore it was assumed that total OZ=total OH.

GPC Analysis

Samples were prepared in certified THF at 0.5% w/v concentration, filtered with a 0.45 um PTFE syringe filter, and analyzed against polystyrene standards. The relative calibration ($3^{rd}$ order fit) used for molecular weight determination was based on 16 polystyrene standards ranging in molecular weights from 580 to 2,320,000 Daltons. The chromatographic equipment consisted of a Waters 2695 Separations Module equipped with a vacuum degasser, a Waters 2410 differential refractometer and two (300 mm×7.5 mm) Polymer Laboratories Mixed C columns (molecular weight separation range of 200 to 3,000,000) preceded by a guard column. The separation was performed using certified grade THF programmed to flow at 1.0 mL/min., injection volume was set at 100 μL and columns and detector were heated to 35° C. Data collection was 25 minutes and processing was performed using Atlas/Cirrus software.

To determine free resin content, the free resin peak at lower molecular weight was integrated to get the area percent.

Rheology Analysis

A commercially available rheometer from TA Instruments (ARES-RDA with 2KSTD standard flexural pivot spring transducer, TA Instruments, New Castle, Del. 19720) with forced convection oven was used to measure the storage modulus (G'), loss modulus (G") and tan delta as a function of temperature. Test specimens (typically 8 mm wide, 1 mm thick) were loaded in between parallel plates and measured using small strain oscillatory rheology while ramping the temperature in a range from 25° C. to 300° C. at 2° C./min (frequency 1 Hz).

To characterize the copolymers, the flow onset was calculated as the inflection temperature in the G' drop (labeled FLOW), the viscosity at 120° C. will be reported as a measure for melt processability and the cure onset was calculated as the inflection temperature in the G' rise (labeled CURE).

The results of the rheological evaluations of the representative examples disclosed herein, are summarized further below in Table 1.

Optical Clarity

Optical clarity was evaluated as the % transmission of light at wavelengths from about 350-1000 nanometers, measured through 1 mm thick samples of cast sheets of the present compositions. Generally, samples having a % transmittance of at least 95% were considered to be optically clear.

Example 1

Reference

Synthesis of Oxime Capped PDMS Using Methyl Tris(Methylethylketoxime)Silane

In an approximately 500 mL jar under a nitrogen atmosphere, a solution of 180.0 g tertiary butyl acetate (Lyondell), 115.2 g silanol terminated polydimethylsiloxane (PDMS, Gelest DMS-S27), and 5.34 g methyl tris(methylethylketoxime)silane was formed and allowed to react for 3 h at 25° C.

Example 2

Reference

Synthesis of Resin-Linear Copolymer in t-Butyl Acetate

The following ingredients were mixed into a 1 liter 3-necked flask; 44.8 g silanol functional phenyl-silsesquioxane resin (DC 217 Flake) and 193.38 g tertiary butyl acetate (Lyondell). It was placed under a nitrogen blanket with a condenser, stir paddle, and thermocouple. The reaction was stirred and heated to reflux. After 30 minutes of heating, the reaction was cooled to 90° C. and 300.54 g of oxime capped PDMS from example 1 was added. The reaction mixture was then reheated to reflux and allowed to react for 9 hours. The resulting solution was clear. The solids content was increased to 65 weight percent on a laboratory rotoevaporator.

Example 3

Reference

Synthesis of Resin-Linear Copolymer in t-Butyl Acetate Treated with n-Butanol

A solution was prepared as in example 1. However, before removal of a portion of the solvent, 16.29 g n-butanol (Fisher Scientific) was added and the solution was held at 100° C. for 3 hours. The solids content was increased to 65 weight percent by removing solvent on a laboratory rotoevaporator.

Example 4

Reference

Synthesis of Resin-Linear Copolymer in t-Butyl Acetate Treated with Hexamethyldisilazane A solution was prepared as in example 1. However, before removal of a portion of the solvent, 16 g hexamethyldisilazane (HMDZ) (provide as DC Z-6079, Dow Corning Corp.) was added and reacted for 3 hours. The solids content was increased to 65 weight percent on a laboratory rotoevaporator.

Example 5

Reference

Synthesis of Resin-Linear Copolymer in p-Chlorobenzotrifluoride Treated with Hexamethyldisilazane The following ingredients were mixed into a 1 liter 3-necked flask: 44.8 g silanol functional phenyl-silsesquioxane resin (DC 217 Flake); 193.38 g p-chlorobenzotrifluoride (Acros Organics). The mixture was then placed under a nitrogen blanket with a condenser, stir paddle, and thermocouple. The reaction mixture was stirred and heated to reflux. After 30 minutes of heating, the reaction mixture was cooled to 90° C. and 300.54 g of silanol capped PDMS using methyl tris (methylethylketoxime)silane was added. The reaction was then reheated to reflux and allowed to react for 1.5 hours. Before solids increase, 16 g HMDZ (DC Z-6079) was added and reacted for 3 hours. The solids content was reduced to 65 weight percent on a laboratory rotoevaporator.

Example 6

Emulsification of Resin-Linear Copolymer Synthesized in Example 2 with an Anionic Surfactant 5 g of resin linear copolymer synthesized in tert-butyl acetate, as described in example 2, with a viscosity greater than 2,000 cp and solids content of 65 wt %, was weighed into a max 20 cup followed by 0.11 g of BioSoft® N-300 (Stepan). This was followed by the addition of 0.33 g deionized (DI) water. The cup was closed and spun for 30 seconds at maximum speed in a SpeedMixer®. The composition in the cup had changed into a white liquid having a viscous consistency and the walls of the container were scraped with a spatula and the cup was spun for an additional 30 seconds at maximum speed. The composition was diluted with 3.85 g of DI water and the cup was spun for 20 seconds at 2,000 rpm. Particle size of the resulting dispersion was measured using light scattering (Malvern Mastersizer®) and found to have a mean particle size (volume percent) of 1.20 µm with 90 percent of the particles being less than 2.38 µm. The dispersion was poured into a mold with a chase of 0.7 mm thickness and allowed to dry under ambient conditions for 120 hours, creating a film that was hazy. Curing this film in a vented oven for 3 hours at 160° C. caused the film to become transparent.

Example 7

Emulsification of Resin-Linear Copolymer Synthesized in Example 2 with a Nonionic Surfactant 5 g of resin linear copolymer synthesized in tert-butyl acetate, with a viscosity greater than 2,000 cp and solids content of 65 percent by weight, was weighed into a max 20 cup followed by 0.09 g of Arlasolve® 200 (Croda). This was followed by the addition of 0.27 g deionized (DI) water. The cup was closed and spun for 30 seconds at maximum speed in the SpeedMixer®. The composition in the cup had changed into a white liquid having a viscous consistency and the walls of the container were scraped with a spatula and the cup was spun for an additional 30 seconds at maximum speed. The composition was diluted with 3.91 g of DI water and the cup was spun for 20 seconds at 2,000 rpm. Particle size of the resulting dispersion was measured using light scattering (Malvern Mastersizer®) and found to have a mean particle size (volume %) of 1.14 µm with 90% of the particles being less than 2.12 µm. The dispersion was poured into a mold with a case of 0.7 mm thickness and allowed to dry under ambient conditions for 120 hours, creating a film that was hazy. Curing this film in a vented oven for 3 hours at 160° C. caused the film to become transparent.

Example 8

Emulsification of Resin-Linear Copolymer of Example 2 with a Nonionic Surfactant 5 g of resin linear copolymer synthesized in tert-butyl acetate, with a viscosity greater than 2,000 cp and solids content of 65 percent by weight, was weighed into a max 20 cup followed by 0.09 g of Brij® 35L (Croda). This was followed by the addition of 0.27 g deionized (DI) water. The cup was closed and spun for 30 seconds at maximum speed in the SpeedMixer®. The composition in the cup had changed into a white liquid having a viscous consistency and the walls of the container were scraped with a spatula and the cup was spun for an additional 30 seconds at maximum speed. The composition was diluted with 3.91 g of DI water and the cup was spun for 20 seconds at 2,000 rpm. Particle size of the resulting dispersion was measured using light scattering (Malvern Mastersizer®) and found to have a mean particle size (volume percent) of 1.14 µm with 90% of the particles being less than 2.12 µm. The dispersion was poured into a mold with a chase of 0.7 mm thickness and allowed to dry under ambient conditions for 120 hours, creating a film that was hazy. Curing this film in a vented oven for 3 hours at 160° C. caused the film to become transparent.

TABLE 1

List of synthesized emulsions. Films were dried under ambient conditions for 120 hours and cured in a vented oven for 3 hours at 160° C.

| Sample | Emulsification Procedure Based on: | Mean Particle Size (µm) | Uncured Emulsion Appearance | Cured Emulsion Appearance |
|---|---|---|---|---|
| Example 2 | Example 6 | 0.78 | Hazy | Yellow and Clear |
| Example 2 | Example 7 | 1.10 | Hazy | Clear |
| Example 2 | Example 8 | 6.33 | Hazy | Clear |
| Example 3 | Example 6 | 1.20 | Hazy | Yellow and Clear |
| Example 3 | Example 7 | 1.14 | Hazy | Clear |
| Example 3 | Example 8 | 2.91 | Hazy | Clear |
| Example 4 | Example 6 | 2.60 | Hazy | Yellow and Clear |
| Example 4 | Example 7 | 0.94 | Hazy | Clear |
| Example 4 | Example 8 | 0.88 | Hazy | Clear |
| Example 5 | Example 6 | 3.45 | Hazy | Clear |

Example 8

Tensile Properties of Films Cast from t-Butyl Acetate Solution and Emulsion

Using an Alliance RT/5 MTS®, samples were pulled until 300 percent elongation or breakage. Table 2 lists the effect of aging the emulsion in a 50° C. oven for 24 and 48 hours on tensile properties. Cure was invoked by annealing samples at 160° C. for 3 h.

TABLE 2

Tensile strength and percent elongation of solution cast and emulsified films.

| Sample | Emulsion Procedure Based On: | Solution | | Emulsion | | | |
|---|---|---|---|---|---|---|---|
| | | Uncured | Cured | Aged 0 Hours | Aged 24 Hours | Aged 48 Hours | Cured |
| Example 2 | Example 6 | 0.3 MPa 70% | 1.2 MPa 350% | 0.1 MPa 30% | 0.1 MPa 25% | 0.6 MPa 110% | 3.3 MPa 340% |
| Example 2 | Example 7 | 0.3 MPa 70% | 1.2 MPa 350% | 0.3 MPa 75% | 0.2 MPa 65% | 0.5 MPa 118% | 1.3 MPa 314% |
| Example 2 | Example 8 | 0.3 MPa 70% | 1.2 MPa 350% | 0.1 MPa 45% | 0.1 MPa 43% | 0.5 MPa 94% | — |
| Example 3 | Example 6 | 0.2 MPa 65% | 0.5 MPa 144% | 0.2 MPa 25% | Broke before test | 0.3 MPa 75% | 1.2 MPa 213% |

TABLE 2-continued

Tensile strength and percent elongation of solution cast and emulsified films.

| Sample | Emulsion Procedure Based On: | Solution Uncured | Solution Cured | Emulsion Aged 0 Hours | Emulsion Aged 24 Hours | Emulsion Aged 48 Hours | Cured |
|---|---|---|---|---|---|---|---|
| Example 3 | Example 7 | 0.2 MPa 65% | 0.5 MPa 144% | 0.2 MPa 74% | 0.2 MPa 66% | 0.3 MPa 99% | — |
| Example 3 | Example 8 | 0.2 MPa 65% | 0.5 MPa 144% | 0.1 MPa 45% | 0.2 MPa 105% | 0.5 MPa 130% | 2.1 287% |
| Example 4 | Example 6 | 0.4 MPa 86% | 1.1 MPa 345% | 0.1 MPa 37% | Broke before test | — | — |
| Example 4 | Example 7 | 0.4 MPa 86% | 1.1 MPa 345% | 0.2 MPa 141% | 0.2 MPa 163% | — | — |
| Example 4 | Example 8 | 0.4 MPa 86% | 1.1 MPa 345% | 0.2 MPa 202% | 0.1 MPa 195% | — | 0.4 252% |
| Example 5 | Example 6 | 1.0 MPa 389% | 1.0 MPa 448% | — | — | 0.7 MPa 240% | 0.6 MPa 137% |

The invention claimed is:

1. An aqueous silicone emulsion comprising:
   A) an organosiloxane block copolymer comprising;
   40 to 90 mole percent disiloxy units of the formula [$R^1_2SiO_{2/2}$—]
   10 to 60 mole percent trisiloxy units of the formula [$R^2SiO_{3/2}$]
   0.5 to 35 mole percent silanol groups [≡SiOH]
   where $R^1$ is independently a $C_1$ to $C_{30}$ hydrocarbyl,
   $R^2$ is independently a $C_1$ to $C_{20}$ hydrocarbyl,
   wherein;
   the disiloxy units [$R^1_2SiO_{2/2}$—] are arranged in linear blocks having an average of from 10 to 400 disiloxy units [$R^1_2SiO_{2/2}$—] per linear block,
   the trisiloxy units [$R^2SiO_{3/2}$] are arranged in non-linear blocks having a molecular weight of at least 500 g/mol, and at least 30% of the non-linear blocks are crosslinked with each other,
   each linear block is linked to at least one non-linear block, and the organosiloxane block copolymer has a molecular weight of at least 20,000 g/mole;
   B) 0.1 to 50 parts by weight of an emulsifier for every 100 parts by weight of the organosiloxane block copolymer.

2. The silicone emulsion of claim 1 wherein $R^2$ is phenyl or methyl.

3. The silicone emulsion of claim 1 wherein $R^2$ is phenyl.

4. The silicone emulsion of claim 1 wherein each $R^1$ is independently methyl or phenyl or a combination of both.

5. The silicone emulsion of claim 1 wherein a portion of the disiloxy units have the formula [(CH$_3$)(C$_6$H$_5$)SiO$_{2/2}$—].

6. The silicone emulsion of claim 1 wherein a portion of the disiloxy units have the formula [(CH$_3$)$_2$SiO$_{2/2}$—].

7. The silicone emulsion of claim 1 where the emulsifier is an ethoxylated fatty alcohol.

8. The silicone emulsion of claim 1 where the emulsifier is a dodecylbenzene sulfonate.

9. A process for making a silicone emulsion comprising:
   I) forming a mixture comprising;
   A) 100 parts by weight of an organosiloxane block copolymer comprising;
   40 to 90 mole percent disiloxy units of the formula [$R^1_2SiO_{2/2}$—]
   10 to 60 mole percent trisiloxy units of the formula [$R^2SiO_{3/2}$]
   0.5 to 35 mole percent silanol groups [≡SiOH]
   where $R^1$ is independently a $C_1$ to $C_{30}$ hydrocarbyl,
   $R^2$ is independently a $C_1$ to $C_{20}$ hydrocarbyl,
   wherein;
   the disiloxy units [$R^1_2SiO_{2/2}$—] are arranged in linear blocks having an average of from 10 to 400 disiloxy units [$R^1_2SiO_{2/2}$—] per linear block,
   the trisiloxy units [$R^2SiO_{3/2}$] are arranged in non-linear blocks having a molecular weight of at least 500 g/mol, and at least 30% of the non-linear blocks are crosslinked with each other,
   each linear block is linked to at least one non-linear block, and the
   organosiloxane block copolymer has a molecular weight of at least 20,000 g/mole;
   c) optionally a solvent; and
   B) 0.1 to 50 parts by weight of an emulsifier,
   II) admixing a sufficient amount of water to the mixture from step I) to form an emulsion,
   III) optionally, further shear mixing the emulsion.

10. A coating composition comprising the silicone emulsion of claim 1.

11. A cured product of the silicone emulsion of claim 1.

12. A coating composition comprising the cured product of claim 11.

13. The coating composition of claim 12 wherein the coating is transparent.

14. The cured product of claim 11 wherein the cured product has a tensile strength of at least 0.1 MPa, and a % elongation of at least 50%.

15. A method of forming a coating comprising: applying a film of the silicone emulsion of claim 1 to a surface, and curing the film to form a coating.

16. The silicone emulsion of claim 1, wherein a portion of the disiloxy units have the formula [(CH$_3$)(C$_6$H$_5$)SiO$_{2/2}$] and another portion of the disiloxy units have the formula [(CH$_3$)$_2$SiO$_{2/2}$].

* * * * *